United States Patent
Cao et al.

(10) Patent No.: US 9,983,626 B2
(45) Date of Patent: May 29, 2018

(54) ALL-IN-ONE SMART TABLET PC AND THE ASSEMBLY METHOD THEREOF

(71) Applicant: Guangzhou Shirui Electronics Co., LTD., Guangzhou (CN)

(72) Inventors: Jianhui Cao, Guangzhou (CN);
Fangguang Deng, Guangzhou (CN);
Zongtao Zhang, Guangzhou (CN);
Minxiang Hou, Guangzhou (CN);
Yingjie Wu, Guangzhou (CN)

(73) Assignee: Guangzhou Shirui Electronics Co, Ltd., Guangzhou Science Park, Guangzhou, Guangdong (CN)

(*) Notice: Subject to any disclaimer, the term of this patent is extended or adjusted under 35 U.S.C. 154(b) by 217 days.

(21) Appl. No.: 14/888,331

(22) PCT Filed: Nov. 27, 2014

(86) PCT No.: PCT/CN2014/092348
§ 371 (c)(1),
(2) Date: Oct. 30, 2015

(87) PCT Pub. No.: WO2015/078381
PCT Pub. Date: Jun. 4, 2015

(65) Prior Publication Data
US 2016/0109907 A1    Apr. 21, 2016

(30) Foreign Application Priority Data

Nov. 27, 2013  (CN) .......................... 2013 1 0613935
Nov. 27, 2013  (CN) ..................... 2013 2 0766090 U
(Continued)

(51) Int. Cl.
*G06F 1/16*      (2006.01)
*G06F 3/042*     (2006.01)
(Continued)

(52) U.S. Cl.
CPC .......... *G06F 1/1643* (2013.01); *G06F 1/1605* (2013.01); *G06F 3/042* (2013.01);
(Continued)

(58) Field of Classification Search
CPC .. H05K 5/0217; H05K 5/0221; H05K 7/0208; G06F 1/1643; G06F 1/1605; G06F 3/0412; G06F 3/042; G06F 3/0421
See application file for complete search history.

(56) References Cited

U.S. PATENT DOCUMENTS 4,751,379 A * 6/1988 Sasaki ................... G06F 3/0421
                                               250/221
4,771,170 A * 9/1988 Hasegawa ............. G06F 3/0421
                                               250/221
(Continued)

FOREIGN PATENT DOCUMENTS

CN       101441541 A     5/2009
CN       101566746 A    10/2009
(Continued)

OTHER PUBLICATIONS

International Search Report and Written Opinion for related International Application No. PCT/CN2014/092348; dated Mar. 11, 2015.
(Continued)

*Primary Examiner* — Hoa C Nguyen
*Assistant Examiner* — Christopher L Augustin
(74) *Attorney, Agent, or Firm* — Miller, Matthias & Hull LLP

(57) ABSTRACT

An all-in-one smart tablet PC and the assembly method thereof are disclosed. The all-in-one smart tablet PC includes: a screen, a glass, an infrared touch module, a rear shell and a plurality of screen supports; each of the screen supports is provided with a groove, with the glass inserted
(Continued)

into the groove and matching the groove; each of the screen supports is further provided with a slot, with the infrared touch module positioned into the slot and matching the slot; a supporting tab is provided on a side of the screen support, and a screen frame is formed by the supporting tabs of the screen supports joined together end to end; the screen is installed within the screen frame and the rear shell is installed onto the back of the screen. By the technical solution of the present disclosure, the quality and the qualified rate of the product are improved; meanwhile, no positioning blocks are used during the whole assembly process, which saves cost and improves the assembly efficiency, and is able to meet the requirements for large-scale and modular production.

13 Claims, 12 Drawing Sheets

(30) Foreign Application Priority Data

| Nov. 27, 2013 | (CN) | 2013 2 0766105 U |
| Nov. 27, 2013 | (CN) | 2013 2 0766212 U |

(51) Int. Cl.
*G06F 3/041* (2006.01)
*G02F 1/1333* (2006.01)

(52) U.S. Cl.
CPC .......... *G06F 3/0412* (2013.01); *G06F 3/0421* (2013.01); *G02F 2001/133314* (2013.01); *G02F 2001/133328* (2013.01); *G06F 2203/04103* (2013.01)

(56) References Cited

U.S. PATENT DOCUMENTS

| 4,868,550 | A | * | 9/1989 | Sasaki | G06F 3/0421 250/221 |
| 2008/0174945 | A1 | * | 7/2008 | Lee | H05K 5/02 361/679.01 |
| 2009/0128508 | A1 | | 5/2009 | Sohn et al. | |
| 2009/0128509 | A1 | * | 5/2009 | Kohtz | G06F 1/1626 345/173 |
| 2009/0267889 | A1 | * | 10/2009 | Choi | G02F 1/133308 345/102 |
| 2010/0253637 | A1 | * | 10/2010 | Lieberman | G06F 3/0418 345/173 |
| 2011/0267314 | A1 | * | 11/2011 | Huang | G06F 3/0428 345/175 |
| 2013/0106788 | A1 | * | 5/2013 | Hwang | G06F 3/0428 345/175 |
| 2013/0164479 | A1 | | 6/2013 | Lo et al. | |
| 2014/0002969 | A1 | * | 1/2014 | Hwang | H05K 5/0017 361/679.01 |
| 2014/0084760 | A1 | * | 3/2014 | Yu | H05K 5/0217 312/7.2 |
| 2014/0111706 | A1 | * | 4/2014 | Nakamura | H04N 5/64 348/843 |
| 2014/0232942 | A1 | * | 8/2014 | Yahata | H04N 5/64 348/725 |
| 2014/0264036 | A1 | * | 9/2014 | Hung | G06F 3/0421 250/349 |
| 2015/0373857 | A1 | * | 12/2015 | Chikazawa | H04N 5/64 348/726 |

FOREIGN PATENT DOCUMENTS

| CN | 201417354 Y | | 3/2010 |
| CN | 201661999 U | | 12/2010 |
| CN | 201804313 U | | 4/2011 |
| CN | 201917889 U | | 8/2011 |
| CN | 202306507 U | * | 7/2012 |
| CN | 202306507 U | | 7/2012 |
| CN | 103631049 A | | 3/2014 |
| CN | 203658699 U | | 6/2014 |
| CN | 203658980 U | | 6/2014 |
| CN | 203784030 U | | 8/2014 |
| KR | 20100070870 A | | 6/2010 |

OTHER PUBLICATIONS

Office Action for priority Chinese Patent Application No. 201310613935.2 dated Nov. 2, 2016.
Office Action for priority Chinese Patent Application No. 201310613935.2 dated May 24, 2016.

* cited by examiner

ALL-IN-ONE SMART TABLET PC AND THE ASSEMBLY METHOD THEREOF

CROSS-REFERENCE TO RELATED APPLICATION

This patent application is a 35 USC § 371 U.S. national stage of International Application No. PCT/CN2014/092348, filed on Nov. 27, 2014, which claims priority under the Paris Convention to the Chinese Patent Applications Nos. CN201310613935.2, CN201320766090.6, CN 201320766105.9 and CN 201320766212.1, all filed on Nov. 27, 2013.

FIELD OF THE DISCLOSURE

The present invention relates to the technical field of smart tablet computer, and more particularly to an all-in-one smart tablet PC and the assembly method thereof.

BACKGROUND OF THE DISCLOSURE

With the development of the technology of the smart tablet devices, the requirements to the production and assembly efficiencies of smart devices become stricter. For traditional smart tablet devices, there are a large number of scattered components, including a screen, a tempered glass, a front frame, an infrared box, a rear shell, etc., and the installation process is very complicated. For example, before installation, the screen needs to be fixed by a fixing frame, and the glass also needs to be positioned by a pressing block. In this way, the installation process has low efficiency and high cost.

In addition, it is necessary to remove at least the rear shell, the screen, and the fixed connector of a traditional tablet device before detaching an infrared touch module. The whole process is complicated, low efficiency, difficult to maintain and replace. This causes the inconvenience to the user.

SUMMARY OF THE DISCLOSURE

Based on the above, it is necessary to provide an all-in-one smart tablet PC and the assembly method thereof, which may overcome the problems of low efficiency and high cost of the assembling and detaching process of traditional smart tablet devices.

To achieve the above object, the following technical schemes are adopted.

An all-in-one smart tablet PC includes: a screen, a glass, an infrared touch module, a rear shell and a plurality of screen supports; each of the screen supports is provided with a groove, the glass is inserted into the groove and matching the groove; each of the screen supports is further provided with a slot, the infrared touch module is positioned into the slot and matching the slot; a supporting tab is provided on a side of each of the screen supports, the supporting tabs of the screen supports are connected together end to end to form a screen frame; the screen is installed within the screen frame; and the rear shell is installed onto the back of the screen.

A screen support for an all-in-one smart tablet PC is provided according to an embodiment of the present invention. The screen support is provided with a groove for inserting a glass that matches the groove and a slot for inserting an infrared touch module that matches the slot; the screen support is further provided with a supporting tab, and a screen frame for supporting the screen is formed by the supporting tabs of a plurality of screen supports joined together end to end; the slot is arranged along the length of the screen support, and the groove is located between the supporting tab and the slot.

An infrared touch module fixing structure for an all-in-one smart tablet PC is also provided according to an embodiment of the present invention. The infrared touch module fixing structure includes corner covers and a plurality of screen supports; the corner covers are installed between adjacent screen supports, and a screen frame is formed by the plurality of screen supports joined together end to end; the borders of the screen frame are provided with slots, and a plurality of infrared touch modules are positioned respectively into each slots and matching with the slots.

An assembly method of the above all-in-one smart tablet PC is provided according to an embodiment of the present invention. The method includes the steps of:

a. installing corner cover seats onto a corresponding screen support, positioning four screen supports around each side of a glass, aligning grooves of each screen support with edges of the glass and fitting the edge of the glass into the four screen supports;

b. forming a screen frame by supporting tabs of the four screen supports of step a, positioning a screen into the screen frame, and fixing the screen into the screen frame by a screw passing through a second screw hole provided in the supporting tab and a first screw hole provided in the screen back plate;

c. fixing a printed circuit board assembly (PCBA) of an infrared touch module onto the screen back plate;

d. fixing a rear shell onto the screen back plate;

e. inserting the infrared touch module and an infrared filter tape into slots provided on the respective screen supports;

f. installing a corner cover onto corner cover seat between adjacent screen supports.

In the all-in-one smart tablet PC of present invention, the glass is positioned by the plurality of grooves of the screen supports. Thanks to these grooves, the glass will remain flat without deformation caused by external forces, so as to prevent oversized gap between the glass and the front frame caused by the four rising corners of the glass. The quality and the qualified rate of the product are thus improved. Further, the screen is fixed into the screen frame formed by the plurality of supporting tabs 105, and the infrared touch module is inserted into the slots of the screen supports. No positioning blocks are used during the whole assembly process. This saves cost and improves the assembly efficiency, and is able to meet the requirement for large-scale and modular production. In addition, by the assembly method of the all-in-one smart tablet PC of the present invention, the positioning blocks for the glass and the screen in traditional structures are omitted, which lowers cost and improves the efficiency. Various positioning supports on the traditional screen back plate are also omitted, which simplified the structure, lowers the cost and weight. The infrared touch module is directly inserted into the slots, which enables fast detaching and assembling by saving many steps of the process and improves the efficiency.

LIST OF REFERENCE NUMBERS

100: screen support; 101: first screen support; 102: second screen support; 103: groove; 104: slot; 105: supporting tab; 106: screen frame; 107: recess; 108: fitting recess; 109: second screw hole; 110: first slot wall; 111: second slot wall; 112: first groove wall; 113: second groove wall; 114: first inclined portion; 115: first fitting recess; 116: second fitting recess; 117: second inclined portion; 118: gap; 119: detent; 120: first fitting opening; 200: screen; 201: liquid crystal glass; 202: middle frame; 203: screen back plate; 204: first screw hole; 205: buckle; 206: second fitting opening; 300: glass; 400: infrared touch module; 401: fit edge; 500: rear shell; 501: PCBA; 600: corner cover; 700: corner cover seat; 701: screw through hole; 800: protrusion; 900: screw; 1000: infrared filter tape.

DETAILED DESCRIPTION OF THE DISCLOSURE

The method of the present disclosure will be better illustrated by the following embodiment described in detail.

Example One

Figure 1:
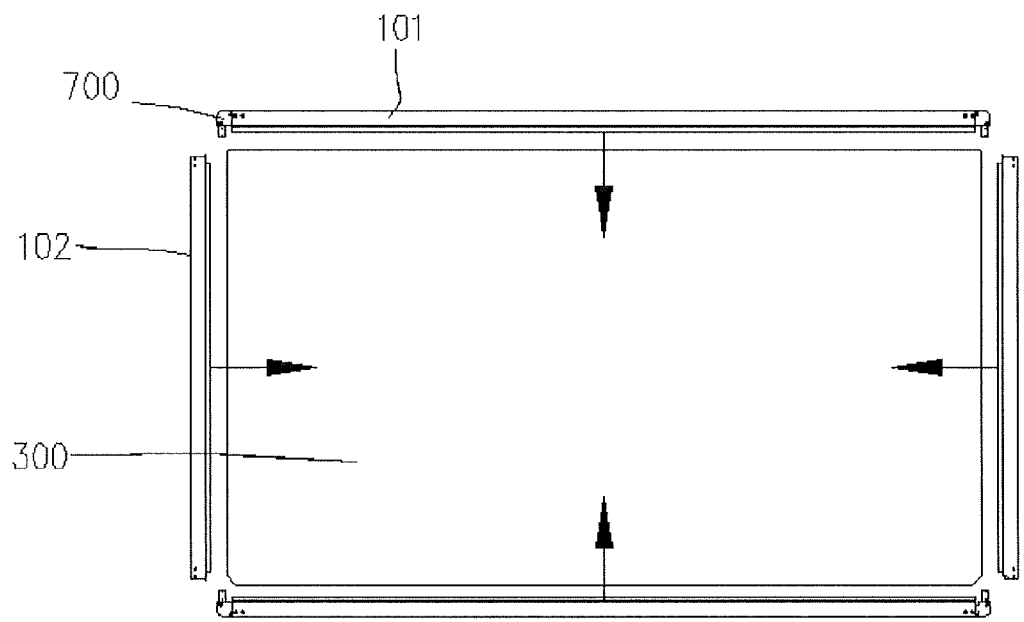
FIG. 1 is a schematic diagram showing the installation of the glass in step a of the assembly method of the all-in-one smart tablet PC of the present invention.
Figure 2:
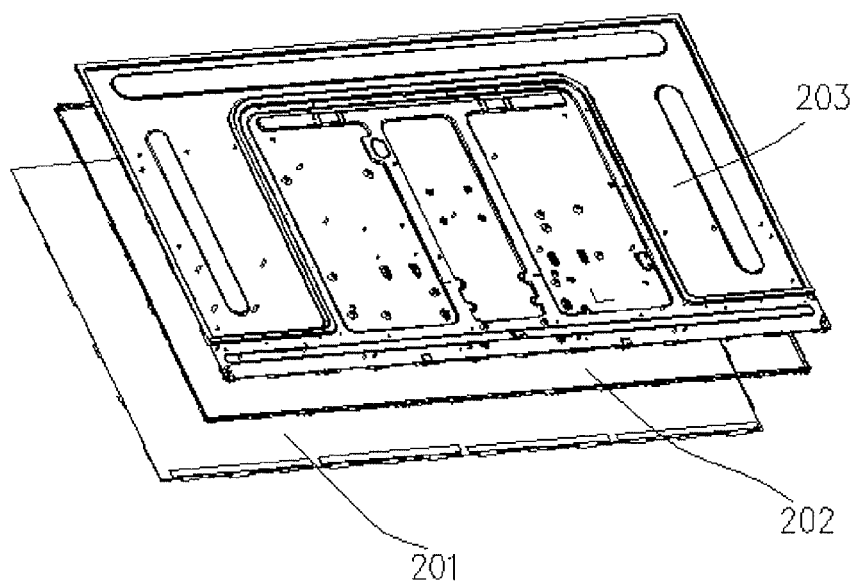
FIG. 2 is a schematic diagram showing the installation of the screen of the assembly method of the all-in-one smart tablet PC of the present invention.
Figure 3:
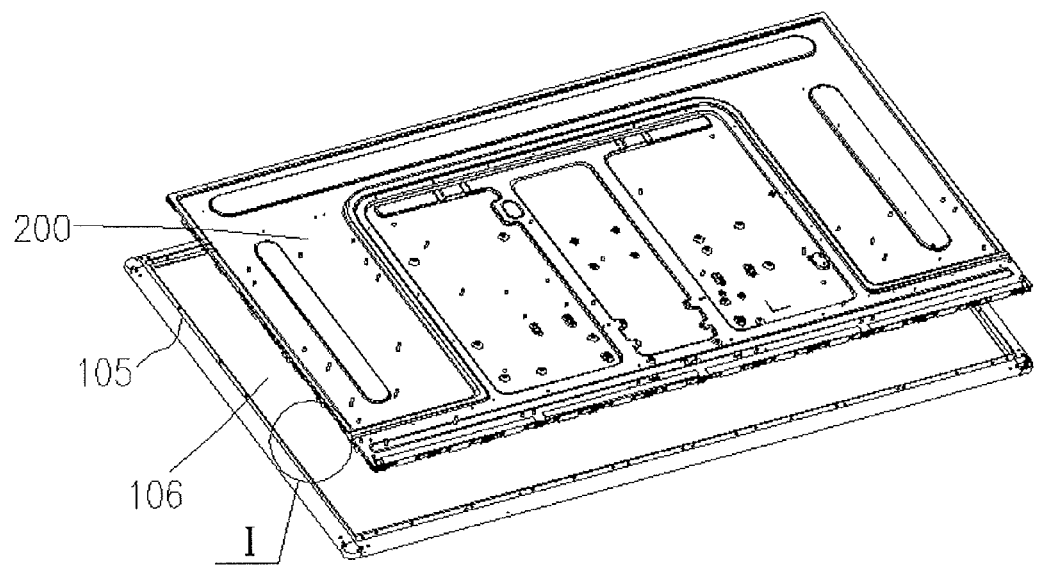
FIG. 3 is a schematic diagram showing the installation of the screen into the screen frame in step b of the assembly method of the all-in-one smart tablet PC of the present invention.
Figure 4:
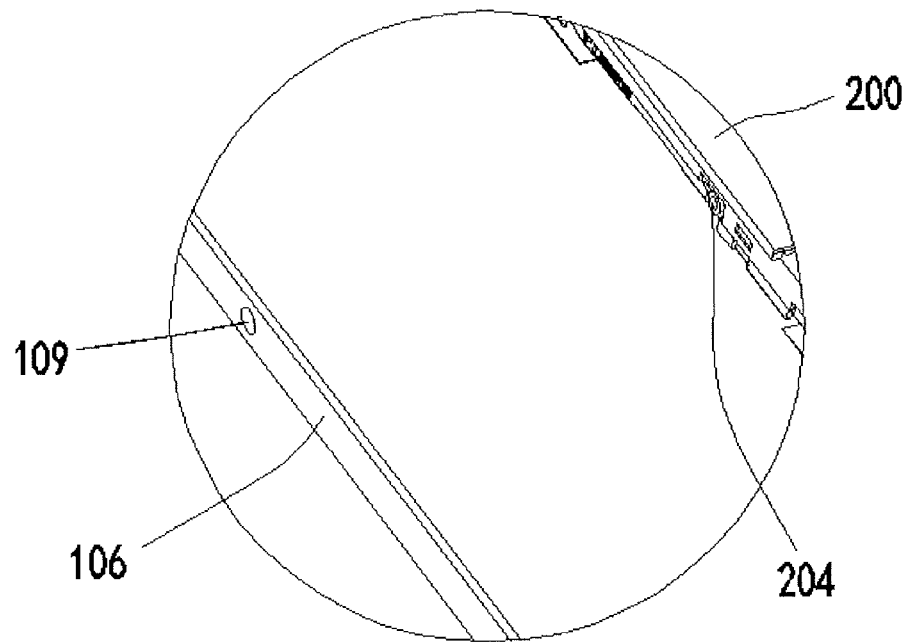
FIG. 4 is an enlarged view of the part labeled I of FIG. 3.
Figure 5:
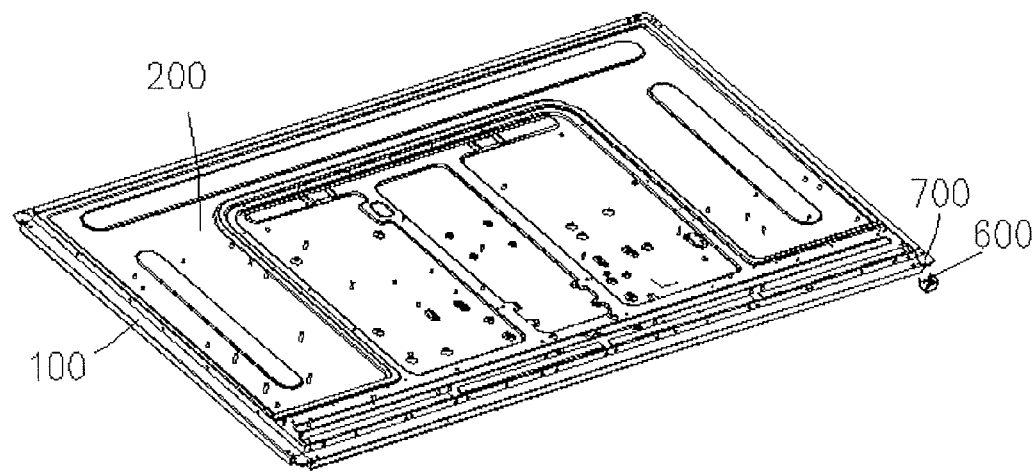
FIG. 5 is a schematic diagram showing the screen installed into the screen frame of the all-in-one smart tablet PC of the present invention.
Figure 6:
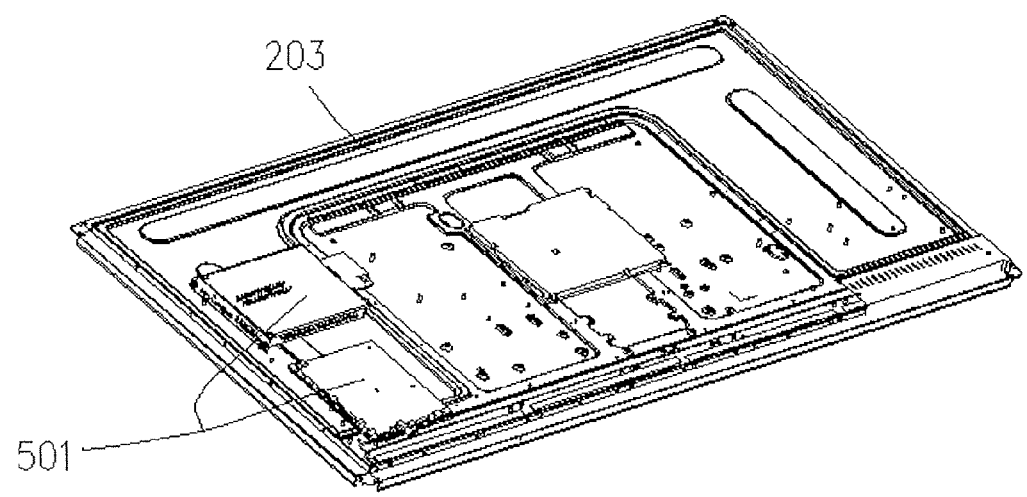
FIG. 6 is a schematic diagram showing the screen back plate of the all-in-one smart tablet PC of the present invention.
Figure 7:
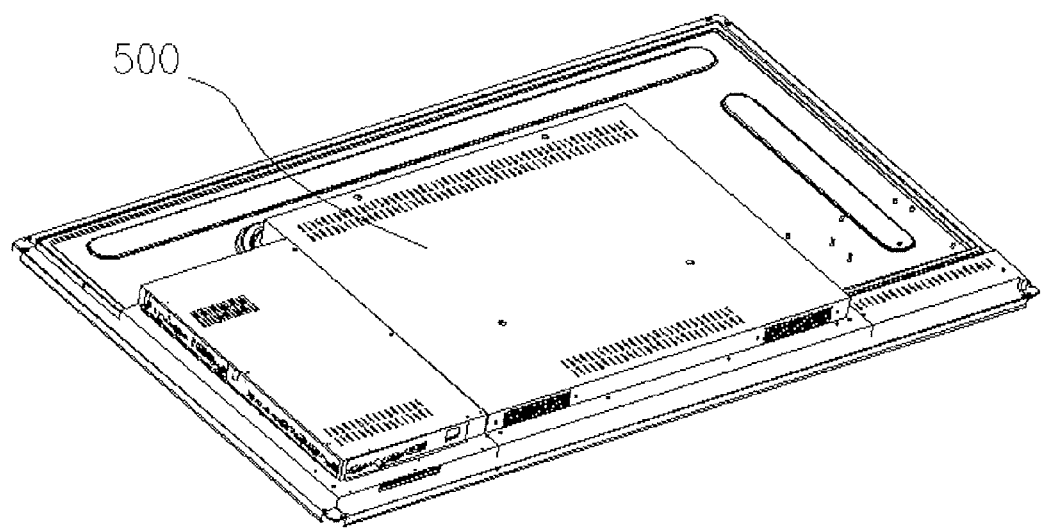
FIG. 7 is a schematic diagram showing the rear shell of the all-in-one smart tablet PC of the present invention.
Figure 8:
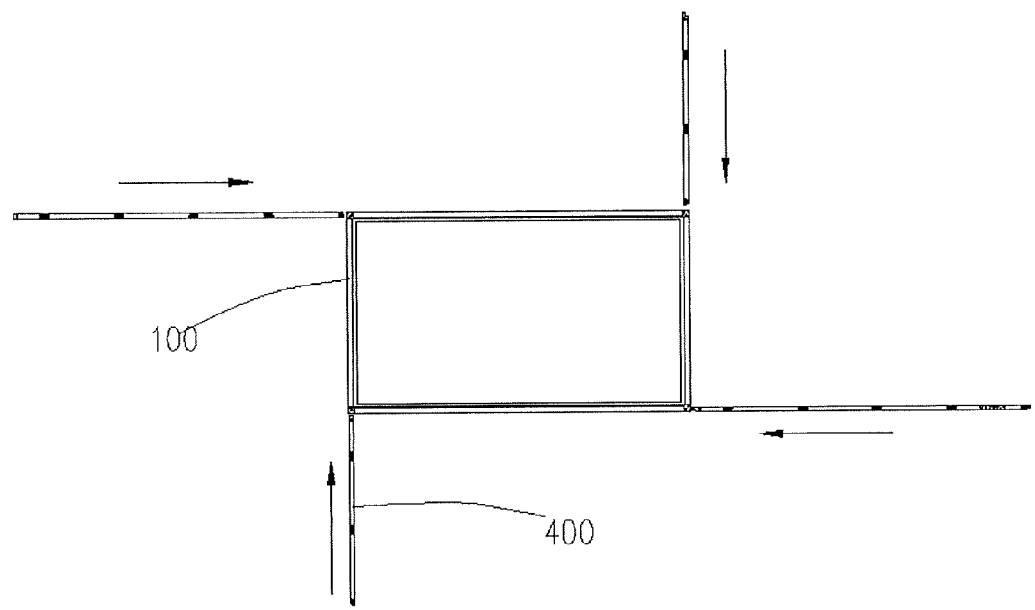
FIG. 8 is a schematic diagram showing the installation of the infrared touch module of the step e of the assembly method of the all-in-one smart tablet PC of the present invention.
Figure 9:
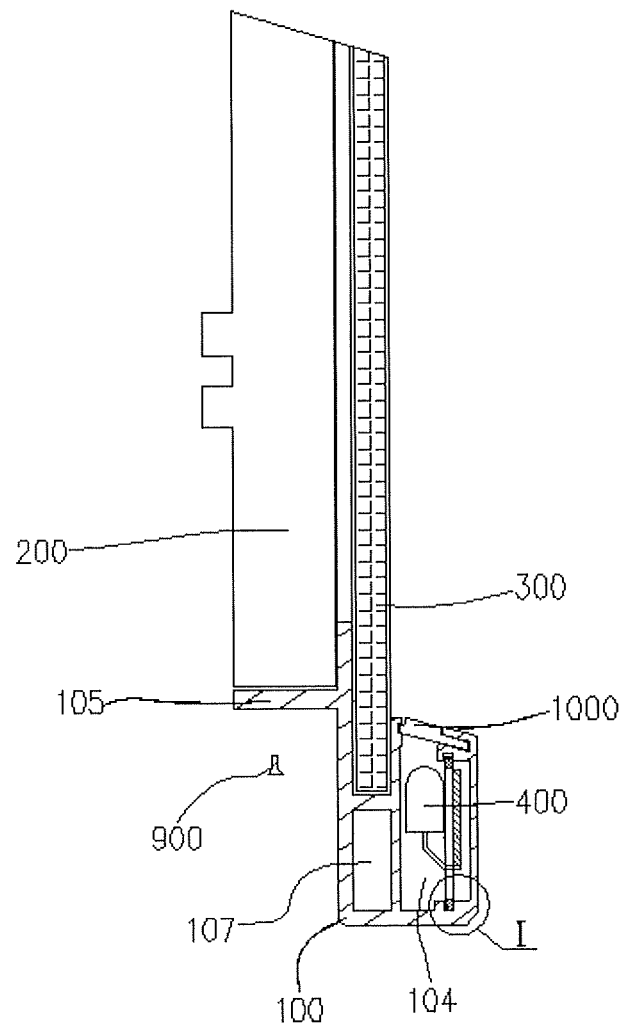
FIG. 9 is a schematic diagram showing the assembly of the screen support, the screen, the glass and the infrared touch module of the all-in-one smart tablet PC.
Figure 10:
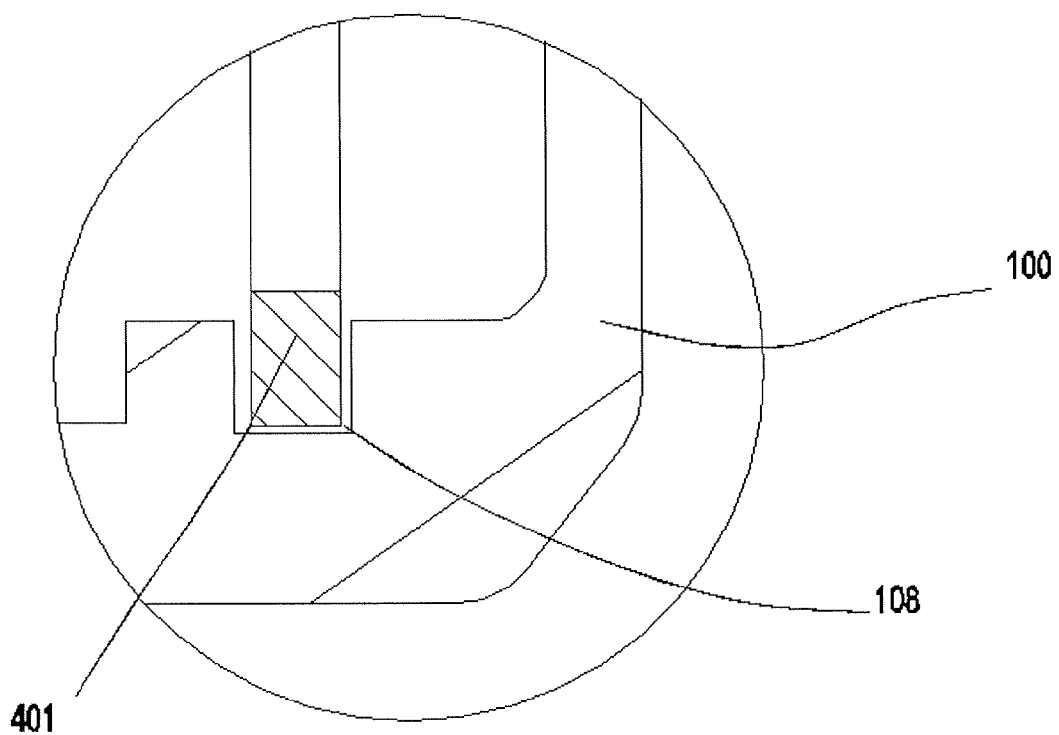
FIG. 10 is an enlarged view of the part labeled I of FIG. 9.
Figure 11:
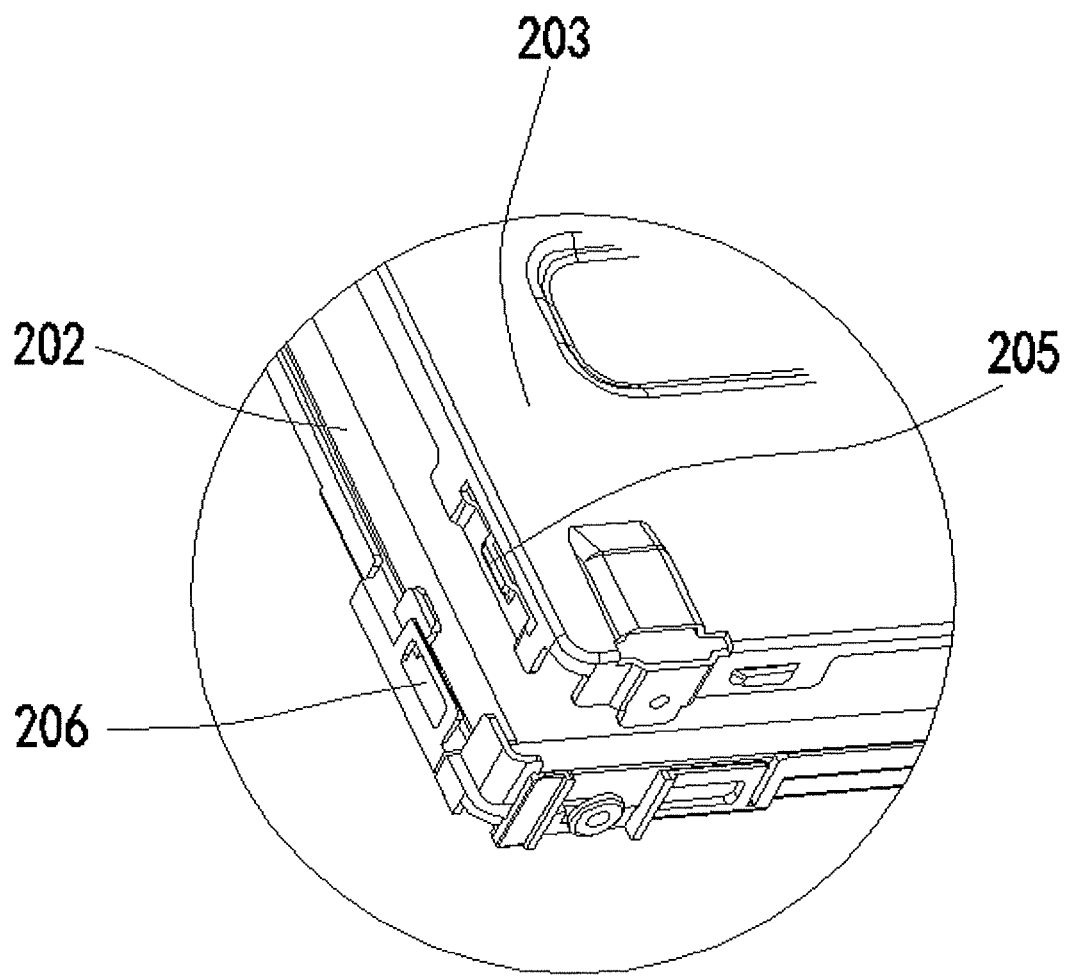
FIG. 11 is a schematic diagram showing the assembly of the middle frame and the screen back plate of the all-in-one smart tablet PC of the present invention.
Figure 12:
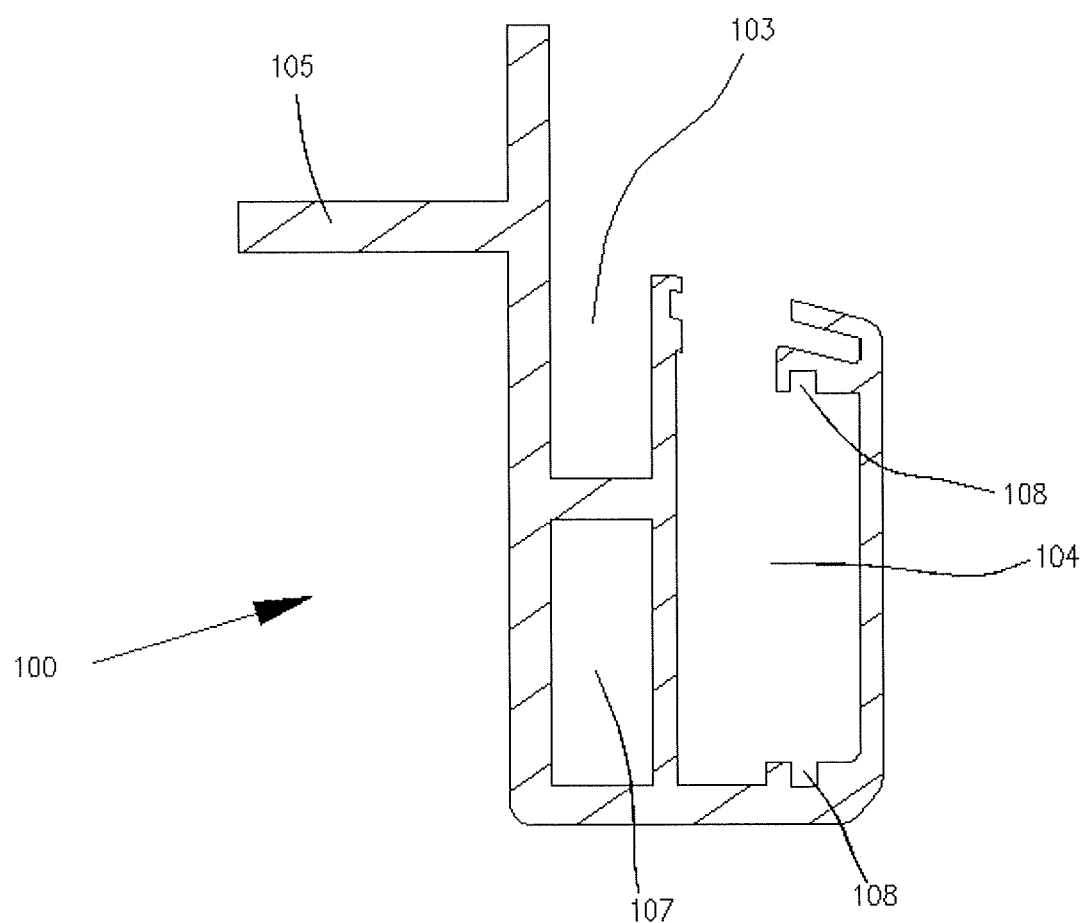
FIG. 12 is a schematic diagram showing a section of the screen support for the all-in-one smart tablet PC of the present invention.
Figure 13:
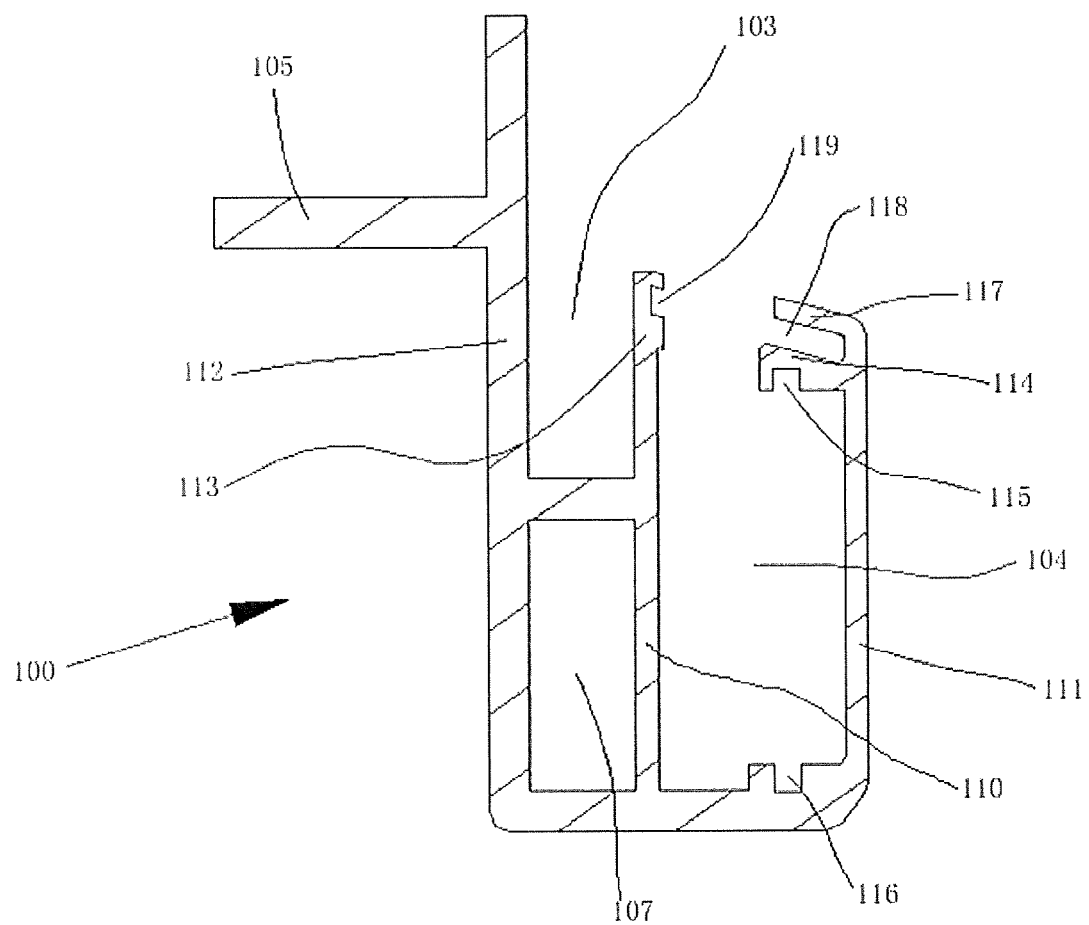
FIG. 13 is a schematic diagram showing a screen support for the all-in-one smart tablet PC according to another embodiment of the present invention.
Figure 14:
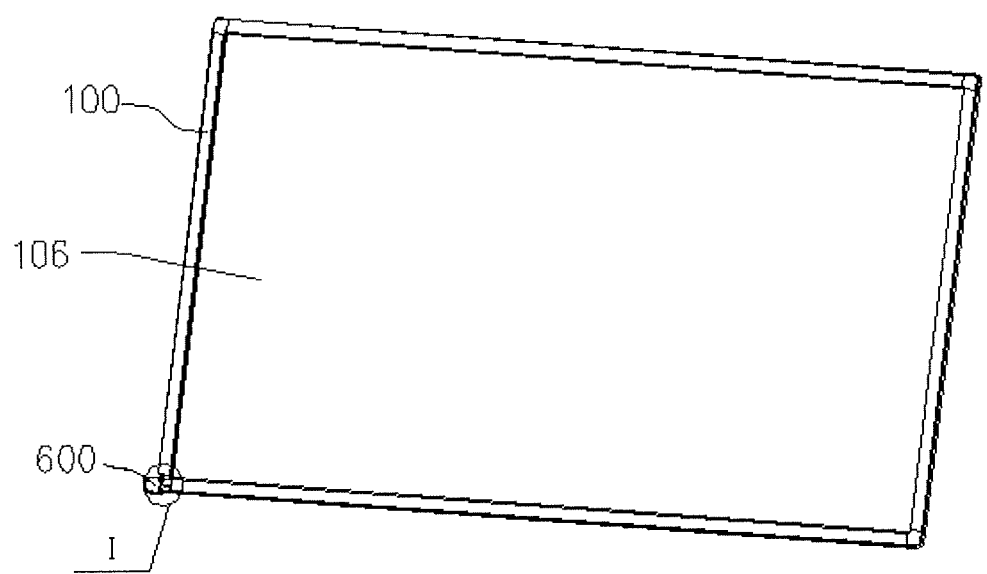
FIG. 14 is a schematic diagram showing an infrared touch module fixing structure of the present invention.
Figure 15:
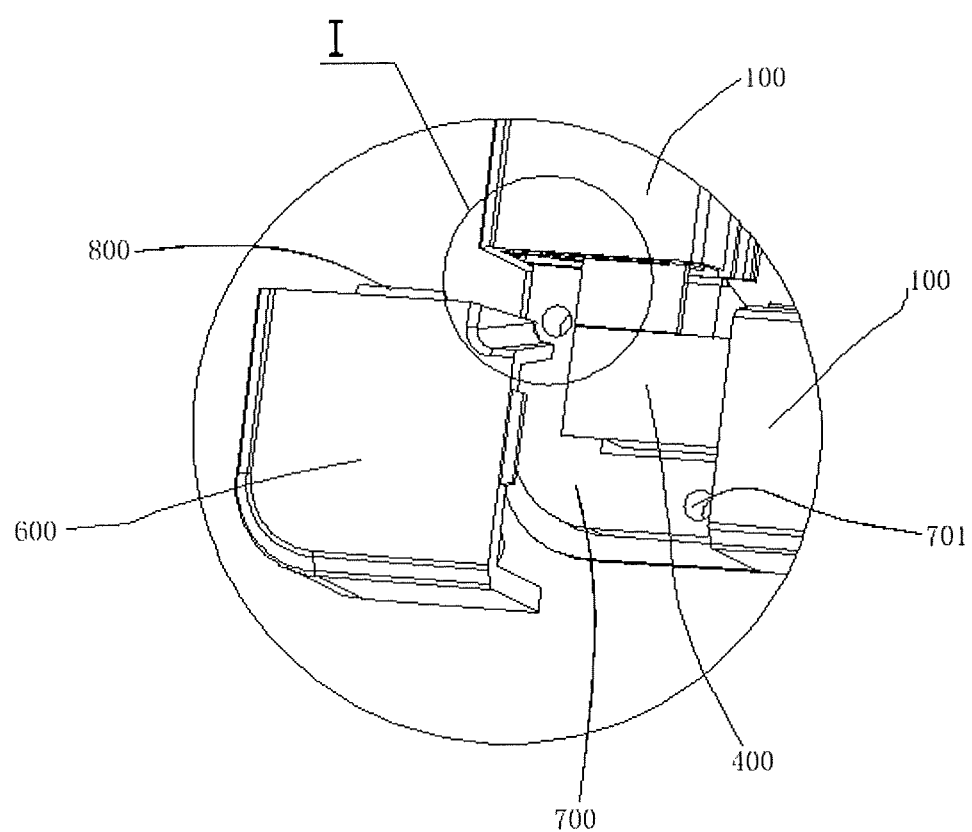
FIG. 15 is an enlarged view of the part labeled I of FIG. 14.
Figure 16:
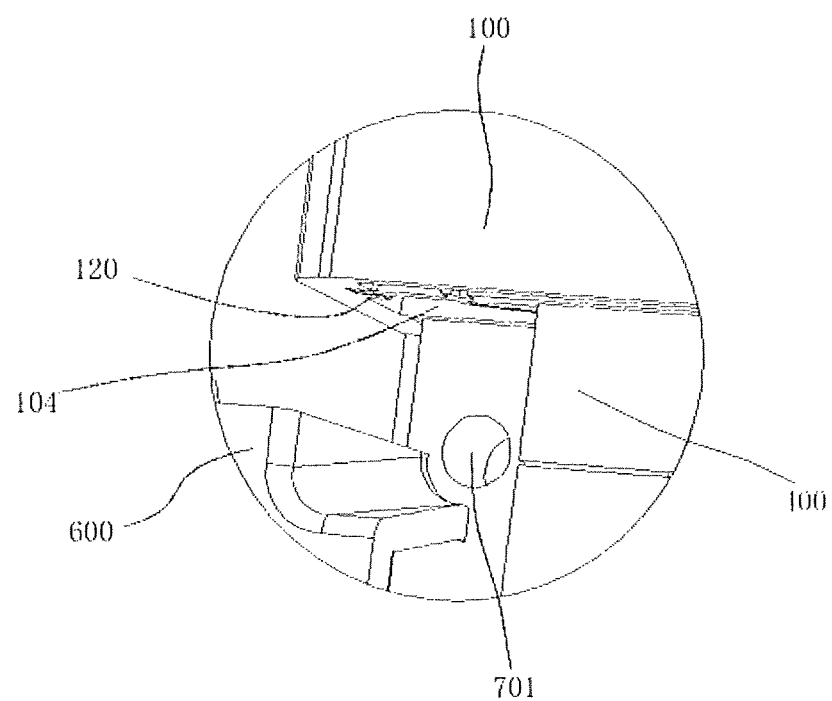
FIG. 16 is an enlarged view of the part labeled I of FIG. 15.

As shown in FIGS. 1-16, according to an embodiment of the present invention, an all-in-one smart tablet PC includes a screen 200, a glass 300, an infrared touch module 400, a rear shell 500 and a plurality of screen supports 100. A screen support 100 is provided with a groove 103, in which the glass 300 is inserted and engaged therein. The screen support 100 is further provided with a slot 104, in which the infrared touch module 400 is inserted and engaged therein. The screen support 100 is provided on one side with a supporting tab 105, with each supporting tab 105 of the respective screen support 100 forming a screen frame 106 by joining together end to end. The screen 200 is mounted onto the screen frame 106, and the rear shell 500 is mounted onto the back of the screen 200.

In this embodiment, the glass 300 is positioned by the plurality of grooves 103 of the screen supports 100. By these grooves 103, the glass 300 will be flat without deformation caused by external forces. This will avoid the oversized gap between the glass 300 and the front frame caused by the four rising corners of the glass 300, which improves the quality and the qualified rate of the product. Further, the screen 200 is fixed within the screen frame 106 formed by the plurality of supporting tabs 105, and the infrared touch module 400 is inserted into the slots 104 of the screen supports 100. No positioning blocks are involved during the whole assembly process. This saves cost and improves the assembly efficiency, and is able to meet the requirement for large-scale and modular production.

In one of the embodiments, the all-in-one smart tablet PC further includes a corner cover 600 mounted between two adjacent screen supports 100. The corner cover 600 is provided to prevent dust and other debris from entering into the slot 104 and protect the infrared touch module therein. When detaching the infrared touch module, open the corner cover 600, and pull the infrared touch module inserted into the slot 104 with a certain force. When assembling, align and insert the infrared touch module into the slot 104 with a certain force, and close the corner cover 600. Compared to traditional structures, the assembling and detaching process is quite convenient and swift, saving many assembling and detaching steps and improving the efficiency for better use in large-scale and modularized production.

In the embodiment, the screen support 100 may include a first screen support 101 and a second screen support 102. The first screen support 101 is provided on its each end with a corner cover seat 700, the second screen support 102 is provided on its each end with a recess 107, and one end of the corner cover seat 700 is provided with a protrusion 800 matching first fitting opening 120, with the corner cover 600 mounted on the corner cover seat 700. The corner cover seat 700 is integral with the first screen support 101, which is easy to use with less components, improving the assembly efficiency. In another embodiment, the all-in-one smart tablet PC further includes a corner cover seat 700, protrusions 800 are provided respectively on the corner cover 600 and the corner cover seat 700; the protrusion 800 matches with the first fitting opening 120, the corner cover seat 700 is mounted between the adjacent screen supports 100, and the corner cover 600 is mounted onto the corner cover seat 700.

Preferably, a fitting recess 108 is provided in the slot 104, the infrared touch module 400 is provided on both sides with fit edges 401, and the fit edges 401 are fitted into the fitting recess 108. In this way, the infrared touch module can be positioned stably.

Preferably, the screen 200 may include a liquid crystal (LC) glass 201, a screen back plate 203 and a middle frame 202. The middle frame 202 is located between the LC glass 201 and the screen back plate 203, the screen back plate 203 is attached to the back of the middle frame 202, the LC glass 201 is mounted onto the front of the middle frame 202, and the screen back plate 203 is attached to the supporting tab 105.

Preferably, the middle frame 202 is provide with a second fitting opening 206 or buckle 205, the screen back plate 203 is provided with a buckle 205 or fitting opening that matches the second fitting opening 206 or buckle 205 of the middle frame 202. The middle frame 202 and the screen back plate 203 are fixed together by the engagement of the buckle 205 and the second fitting opening 206. In this way, the assembling and detaching are fast and are efficient.

Preferably, a side of the screen back plate 203 is provided with a first threaded hole 204, the supporting tab 105 is provided with a second threaded hole 109, and the screen back plate 203 is attached to the supporting tab 105 by a screw through the second threaded hole 109 and the first threaded hole 204. This is easy and convenient, saving possible positioning blocks used to position the glass 300 and the screen 200, and thus lowering cost and the difficulty.

Preferably, the screen support 100 may be aluminum profile. The aluminum profile has better heat dissipation effect and lighter weight.

Preferably, the all-in-one smart tablet PC further includes an infrared filter tape 100 covering the slot 104.

Example Two

A screen support 100 for an all-in-one smart tablet PC is provided according to an embodiment of the invention. The screen support 100 is provided with a groove 103 for inserting a glass 300 and a slot 104 for inserting an infrared touch module 400, and further provided with a supporting tab 105. The supporting tabs 105 of the plurality of screen supports 100 are joined together end to end to form a screen frame 106 for supporting the screen 200. The slot 104 is arranged along the length of the screen support 100, and the groove 103 is located between the supporting tab 105 and the slot 104.

Preferably, the supporting tab 105 is provided with a through hole or a threaded hole, and the screen support 100 is fixed with the screen 200 by the screw though the through hole or threaded hole. This is easy and convenient, saving possible auxiliary positioning parts compared with traditional structure, and thus lowering cost and improving the efficiency.

Preferably, the slot walls on both sides of the slot 104 include a first slot wall 110 and a second slot wall 111, and the groove walls on both sides of the groove 103 include a first groove wall 112 and a second groove wall 113. The upper portion of the first slot wall 110 is overlapped with the second groove wall 113. The supporting tab 105 is provided on the first groove wall 112. The upper end of the second slot wall 111 is provided with a first inclined portion 114 extending toward the first slot wall 110 along the second slot wall 111. The first inclined portion 114 is provided with a first fitting recess 115, and the bottom of the slot 104 is provided with a second fitting recess 116 corresponding to the first fitting recess 115. The infrared touch module 400 is mounted within the slot 104 and fixed by the first fitting recess 115 and the second fitting recess 116. In this way, the infrared touch module 400 is stably fixed.

Preferably, the upper end of the second slot wall 111 may be provided with a second inclined portion 117 forming a gap 118 therebetween with a first inclined portion 114. The first slot wall 110 is provided with an indent 119 corresponding to the gap 118. The gap 118 and the indent 119 are configured to receive a cover plate, so as to protect the infrared touch module 400 positioned into the slot 104.

Preferably, the screen support 100 may include the above cover plate, with both sides of the cover plate fitted respectively into the gap 118 and the indent 119. The cover plate may be transparent or semi-transparent.

Preferably, the screen support 100 is provided with a recess 107 located below the groove 103 and on one side of the first slot wall 110.

It is to be understood that the other technical features of the screen support for an all-in-one smart tablet PC of this embodiment are the same as those of the above all-in-one smart tablet PC and shall not be repeated herein.

Example Three

An infrared touch module fixing structure for an all-in-one smart tablet PC is disclosed according to an embodiment of the present invention. The infrared touch module fixing structure includes a corner cover 600 and a plurality of screen supports 100. The corner cover 600 is mounted between the adjacent screen supports 100. A plurality of screen supports 100 are joined together end to end to form a screen frame 106. Slots 104 are provided within the peripheral border of the screen frame 106 (that is, the screen support 100) for receiving and matching a plurality of infrared touch modules 400.

The slots 104 for fixing the infrared touch modules 400 are provided in the screen support 100 according to the embodiment. The corner cover 600 covers the area between adjacent screen supports 100 to prevent dust and other debris from entering into the slot 104 and protect the infrared touch module 400 therein. When detaching the infrared touch module 400, open the corner cover 600, and pull the infrared touch module 400 inserted into the slot 104 with a certain force. When assembling, align and insert the infrared touch module 400 into the slot 104 with a certain force, and close the corner cover 600. Compared to traditional structures, the assembling and detaching process is quite convenient and swift, saving many assembling and detaching steps and improving the efficiency for better use in large-scale and modularized production.

Preferably, the screen support (that is, the border of the screen frame) 100 is provided with a first fitting opening 120, and both sides of the corner cover 600 are provided with protrusions 800. The protrusions 800 on both sides of the corner cover 600 are positioned respectively in the recesses 107 of adjacent screen supports 100 and match the first fitting openings 120. The first fitting opening 120 plays a role of positioning and fixing the corner cover 600 and makes the corner cover 600 more stable.

Preferably, the infrared touch module fixing structure of the present invention may include a corner cover seat 700, with both sides of the corner cover seat 700 provided with protrusions (not shown). The protrusions on both sides of the corner cover seat 700 are inserted respectively into the first fitting openings 120 of the adjacent screen supports 100. The corner cover 600 is mounted onto the corner cover seat 700. The cover seat 700 is provided with a screw through hole 701, and a threaded hole is provided at a position corresponding to the screw through hole 701 on the corner cover 600. The corner cover 600 is fixed by inserting the protrusions on both sides into the first fitting openings 120, and is fixedly connected to the corner cover seat 700 by a screw.

Preferably, the bottom face of the corner cover seat 700 is flush with the border of the screen support 100.

Further, the respective screen supports 100 are detachably connected. The borders of the screen support 100 are formed by four bars of profile in a detachable manner. This structure is easy to assemble and high in efficiency.

It is to be understood that the other technical features of the infrared touch module fixing structure for an all-in-one smart tablet PC of this embodiment are the same as those of the above all-in-one smart tablet PC and shall not be repeated herein.

Example Four

As shown in FIGS. 1-16, an assembly method of the above all-in-one smart tablet PC is disclosed, including the steps of:

a. installing corner cover seats 700 onto a corresponding screen support 100, positioning four screen supports 100 to each side of a glass 300, aligning grooves 103 of each screen support 100 with edges of the glass 300 and fitting the four screen supports 100 into each side of the glass 300;

b. forming a screen frame 106 by supporting tabs 105 of the four screen supports 100 of step a, positioning a screen 200 into the screen frame 106, and fixing the screen 200 into the screen frame 106 by a screw passing through a second screw hole 109 provided in the supporting tab 105 and a first screw hole 204 provided in the screen back plate 203;

c. fixing a printed circuit board assembly (PCBA) 501 onto the screen back plate 203;

d. fixing the rear shell 500 onto the screen back plate 203;

e. inserting an infrared touch module 400 and an infrared filter tape 100 into slots 104 provided on the respective screen supports 100;

f. installing a corner cover 600 onto corner cover seat 700 of adjacent screen supports 100.

In this way, the positioning blocks used with the glass 300 and the screen 200 in traditional structure are omitted, which lowers cost and improves the efficiency. Various positioning supports on the traditional screen back plate 203 are also omitted, which has simpler structure, lower cost and lighter weight. The infrared touch module 400 is directly inserted into the slot 104, which enables fast detaching and assembling, saves the process and improves the efficiency.

Preferably, the method further includes, before step b, the step of: installing a LC glass 201 onto the front of a middle frame 202, and installing the screen back plate 203 onto the back of a middle frame 202. The screen back plate 203 and the middle frame 202 are fixed together by the matching of a buckle 205 and a second fitting opening 206. The installation is easy and fast.

It is to be understood that the other technical features of the assembly method for an all-in-one smart tablet PC of this embodiment are the same as those of the above all-in-one smart tablet PC and shall not be repeated herein.

The above are preferred embodiments of the invention described in detail, and should not be deemed as limitations to the scope of the present invention. It should be noted that variations and improvements will become apparent to those skilled in the art to which the present invention pertains without departing from its spirit and scope. Therefore, the scope of the present disclosure is defined by the appended claims.

The invention claimed is:

1. An all-in-one smart tablet PC, comprising:
a screen, a glass, an infrared touch module, a rear shell and a plurality of screen supports;
wherein each of the screen supports is provided with a groove, the glass is inserted into the groove and matching the groove;
each of the screen supports is further provided with a slot, the infrared touch module is positioned into the slot and matching the slot;
a supporting tab is provided on a side of each of the screen supports, the supporting tabs of the screen supports are connected together end to end to form a screen frame; the screen is installed within the screen frame; and
the rear shell is installed onto the back of the screen, wherein the screen comprises a liquid crystal (LC) glass, a screen back plate and a middle frame, the middle frame being located between the LC glass and the screen back plate, the screen back plate being attached to the back of the middle frame, the LC glass being installed onto the front of the middle frame, and the screen back plate is attached to the supporting tab, wherein a side of the screen back plate is provided with a first threaded hole, the supporting tab is provided with a second threaded hole, and the screen back plate is attached to the supporting tab by a screw passing through the second threaded hole and the first threaded hole.

2. The all-in-one smart tablet PC of claim 1, wherein the all-in-one smart tablet PC further comprises corner covers installed between adjacent screen supports.

3. The all-in-one smart tablet PC of claim 2, wherein the all-in-one smart tablet PC further comprises corner cover seats; each of the screen supports is provided with recesses on both sides thereof, the corner covers and the corner cover seats are respectively provided with protrusions for matching the recesses; the corner cover seats are installed between adjacent screen supports, and the corner covers are installed onto the corner cover seats.

4. The all-in-one smart tablet PC of claim 2, wherein the screen supports comprise a first screen support and a second screen support; the first screen support is provided on both ends with corner cover seats, the second screen support is provided on both ends with recesses, and the corner cover seats are provided on one end with protrusions matching the recesses; the corner covers are installed onto the corner cover seats.

5. The all-in-one smart tablet PC of claim 1, wherein the slot is provided with fitting recesses, the infrared touch module is provided on both sides with fitting edges for fit into the fitting recesses.

6. The all-in-one smart tablet PC of claim 1, wherein the middle frame is provide with a second fitting opening or buckle, and the screen back plate is provided with a buckle or fitting opening that match the second fitting opening or buckle of the middle frame.

7. The all-in-one smart tablet PC of claim 1, wherein the all-in-one smart tablet PC further comprises an infrared filter tape covering the slot.

8. The all-in-one smart tablet PC of claim 1, wherein the screen supports are made of aluminum profile.

9. The all-in-one smart tablet PC of claim 5, wherein the slot walls on both sides of the slot comprise:
a first slot wall and a second slot wall, the groove walls on both sides of the groove, comprise a first groove wall and a second groove wall;
the upper portion of the first slot wall is overlapped with the second groove wall, and the supporting tab is provided on the first groove wall;

the upper end of the second slot wall is provided with a first inclined portion extending toward the first slot wall along the second slot wall;

the first inclined portion is provided with a first fitting recess, and the bottom of the slot is provided with a second fitting recess corresponding to the first fitting recess.

10. The all-in-one smart tablet PC of claim 9, wherein the upper end of the second slot wall is provided with a second inclined portion forming a gap therebetween with the first inclined portion; the first slot wall is provided with an indent corresponding to the gap.

11. The all-in-one smart tablet PC of claim 10, wherein the screen support further comprises a cover plate, with both sides of the cover plate fitted respectively into the gap and the indent.

12. The all-in-one smart tablet PC of claim 11, wherein the cover plate is transparent or semi-transparent.

13. The all-in-one smart tablet PC of claim 9, wherein the screen support is provided with a recess located below the groove and on one side of the first slot wall.

* * * * *